(12) United States Patent
Guillot et al.

(10) Patent No.: US 10,782,652 B2
(45) Date of Patent: Sep. 22, 2020

(54) DEVICE FOR CONTROLLING AN ELECTRIC MOTOR

(71) Applicant: SAFRAN ELECTRONICS & DEFENSE, Boulogne Billancourt (FR)

(72) Inventors: François Guillot, Boulogne Billancourt (FR); Jerôme Piaton, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/470,909

(22) PCT Filed: Dec. 13, 2017

(86) PCT No.: PCT/EP2017/082531
§ 371 (c)(1),
(2) Date: Jun. 18, 2019

(87) PCT Pub. No.: WO2018/114497
PCT Pub. Date: Jun. 28, 2018

(65) Prior Publication Data
US 2019/0339653 A1 Nov. 7, 2019

(30) Foreign Application Priority Data
Dec. 19, 2016 (FR) ..................... 16 62795

(51) Int. Cl.
*G05B 11/01* (2006.01)
*H02K 24/00* (2006.01)

(52) U.S. Cl.
CPC ........... *G05B 11/015* (2013.01); *H02K 24/00* (2013.01)

(58) Field of Classification Search
CPC ....... G05B 11/00; G05B 11/015; H02K 24/00
See application file for complete search history.

(56) References Cited

U.S. PATENT DOCUMENTS

| | | | | | |
|---|---|---|---|---|---|
| 3,445,697 | A | * | 5/1969 | Costa | G01P 3/465 310/68 R |
| 5,430,362 | A | * | 7/1995 | Carr | F02N 11/04 318/139 |

(Continued)

FOREIGN PATENT DOCUMENTS

| | | |
|---|---|---|
| EP | 1 596 494 A2 | 11/2005 |
| WO | WO 94/27361 A1 | 11/1994 |

*Primary Examiner* — Jorge L Carrasquillo
*Assistant Examiner* — Said Bouziane
(74) *Attorney, Agent, or Firm* — Muncy, Geissler, Olds & Lowe, P.C.

(57) ABSTRACT

A control device for controlling an electric motor, the device comprising an inverter and a control module implementing a current servo-control loop for the electric motor; an excitation module producing an excitation signal; a synchro-transmitter comprising two coupling windings, an excitation winding constrained to rotate with a rotor of the electric motor, and three measurement windings, the excitation signal being applied to the excitation winding via the two coupling windings; three first synchronous demodulators, each connected to a respective one of the three measurement windings of the synchro-transmitter and to the excitation signal I, and each generating a current setpoint for the current servo-control loop for use by the control module; and three other synchronous demodulators, each connected to a respective one of the three measurement windings of the synchro-transmitter and to the excitation signal Q, and generating a signal providing information about the angular speed of the rotor of the motor for use by the control module.

9 Claims, 8 Drawing Sheets (56) References Cited

U.S. PATENT DOCUMENTS

| | | |
|---|---|---|
| 6,320,350 B1 | 11/2001 | Take |
| 2003/0210006 A1 | 11/2003 | Kusaka |
| 2006/0061336 A1 | 3/2006 | Anghel et al. |
| 2016/0308423 A1* | 10/2016 | Rozman ................. H02K 11/33 |

* cited by examiner

DEVICE FOR CONTROLLING AN ELECTRIC MOTOR

The invention relates to the field of electric motor control devices.

BACKGROUND OF THE INVENTION

Powering an electric motor such as a three-phase synchronous motor needs a direct current (DC) voltage to be converted into a controlled three-phase alternating current (AC) voltage in order to produce a current setpoint for the electric motor.

For this purpose, it is known in the field of aviation to make use of digital solutions using components of the digital signal processor (DSP), application specific integrated circuit (ASIC), or field programmable gate array (FPGA) type. Those solutions are very complicated to design, to qualify, and to certify, in particular because of the high level of the requirements in the Radio Technical Commission for Aeronautics (RTCA) standards DO-254 and DO-278, or else they are not very reliable, or present insufficient performance in the face of electromagnetic disturbances generated by onboard networks, or in terms of the performance of the system.

Proposals have been made to use passive filter solutions, e.g. using inductors and capacitors. Those solutions are satisfactory, but they require a large volume for housing the filter components.

OBJECT OF THE INVENTION

An object of the invention is to provide a solution that produces a current setpoint for an electric motor without presenting the above-mentioned drawbacks.

SUMMARY OF THE INVENTION

In order to achieve this object, there is provided a control device for a three-phase electric motor, the control device comprising:

an inverter and a control module that generate inverter control signals for implementing a current servo-control loop for the electric motor;

an excitation module producing an excitation signal;

a synchro-transmitter having two coupling windings, one excitation winding constrained to rotate with a rotor of the electric motor, and three measurement windings mounted on a stator of the electric motor, the excitation signal being applied to the excitation winding via the two coupling windings; and three first synchronous demodulators, each connected to a respective one of the three measurement windings of the synchro-transmitter, and each generating a respective current setpoint for the current servo-control loop for use by the control module.

The use of the synchro-transmitter and of the first synchronous demodulators constitutes a solution that is simple, reliable, and compact for generating the current setpoint of the current servo-control loop of the electric motor.

The invention can be better understood in the light of the following description of a particular, non-limiting embodiment of the invention.

BRIEF DESCRIPTION OF THE DRAWINGS

Reference is made to the accompanying drawings, in which.

DETAILED DESCRIPTION OF THE INVENTION

Figure 1:
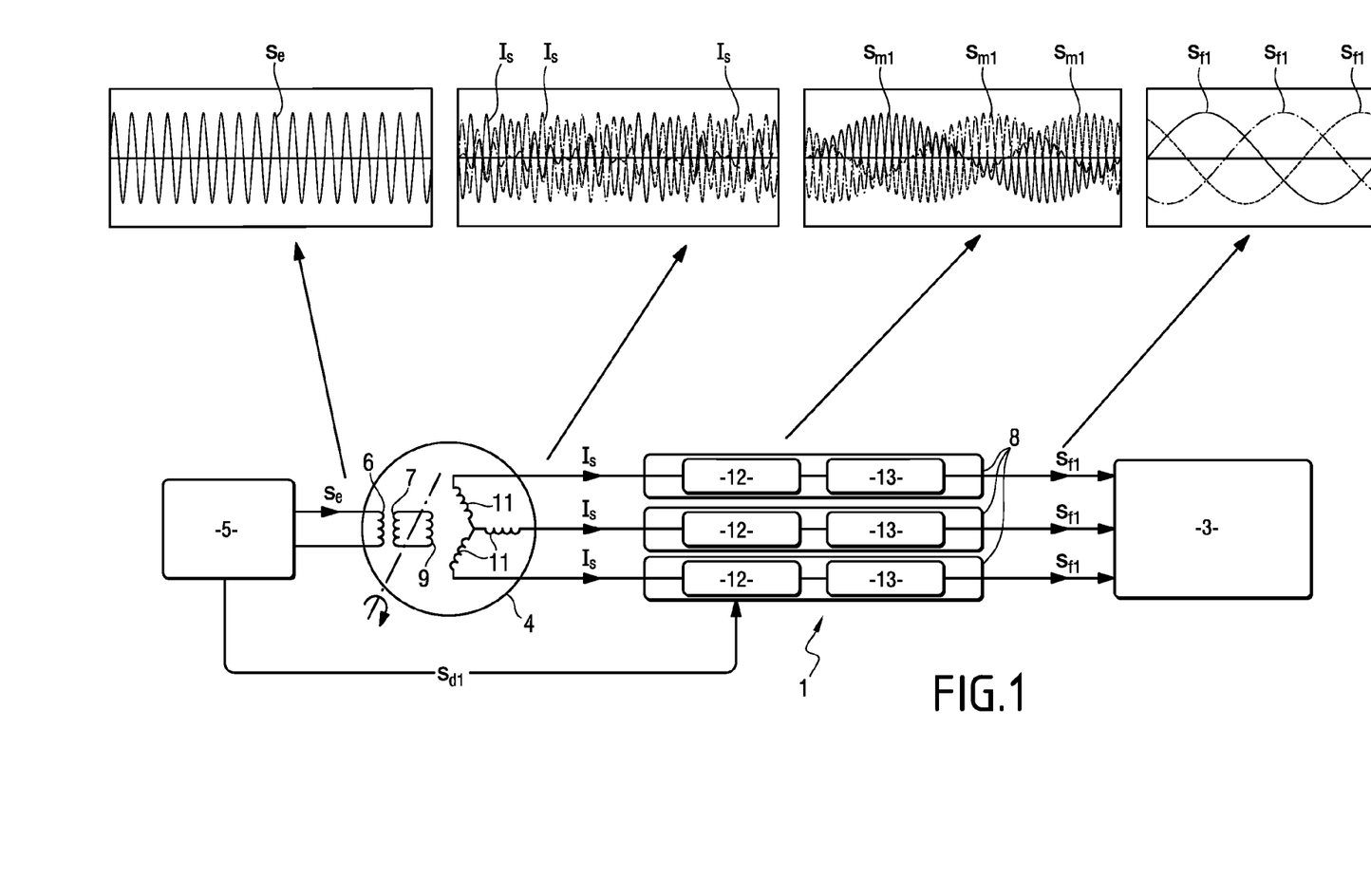
FIG. 1 shows a current servo-control loop of the control device of the invention, and it shows how it operates.

With reference to FIG. 1, the control device 1 of the invention is used in this example to control a three-phase synchronous electric motor.

The control device 1 comprises a control module 3, specifically of the pulse width modulation (PWM) type, a synchro-transmitter 4, an excitation module 5, and three first synchronous demodulators 8.

The control module 3 is used for generating three-phase control signals to control an inverter that powers the electric motor.

The synchro-transmitter 4 comprises a first coupling winding 6, a second coupling winding 7, an excitation winding 9 constrained to rotate with a rotor of the electric motor, and three measurement windings 11.

The stationary first coupling winding 6 is connected to the excitation module 5. The first coupling winding 6 is magnetically coupled to the second coupling winding 7 which is itself constrained to rotate with the rotor of the electric motor. The terminals of the second coupling winding 7 are connected to the terminals of the excitation winding 9.

The excitation module 5 produces an excitation signal $S_e$ at a excitation frequency $f_e$, which is applied to the excitation winding 9 of the synchro-transmitter 4 via the first coupling winding 6 and the second coupling winding 7. In this example, the frequency $f_e$ is equal to 10 kilohertz (kHz). The excitation signal $S_e$ thus induces a stator current $I_s$ in each measurement winding 11 of the synchro-transmitter 4. Each stator current $I_s$ presents an amplitude that is a function of the angular position of the rotor of the electric motor.

The three first synchronous demodulators 8 are each connected to a respective one of the measurement windings 11 of the synchro-transmitter 4.

Each first synchronous demodulator 8 comprises a first multiplier 12 and a first lowpass filter 13. The first multiplier 12 receives a first demodulation signal $S_{d1}$ at the excitation frequency $f_e$ from the excitation module 5, and it multiplies the stator current $I_s$, as present on the measurement winding 11 to which the first multiplier 12 is connected, by this first demodulation signal $S_{d1}$. A first multiplied signal $S_{m1}$ at the output from the first multiplier 12 is applied as input to the first lowpass filter 13.

In this example, the first lowpass filter 13 is a third-order Butterworth filter presenting a −3 decibel (dB) cutoff frequency of 5 kHz, or a third-order Sallen Key active filter presenting a −3 dB cutoff frequency of 5 kHz, or indeed any other type of lowpass filter.

A first filtered signal $S_{f1}$ leaving the first lowpass filter 13 of each first synchronous demodulator 8 is applied as input to the control module 3.

The control module 3 thus receives three first filtered signals $S_{f1}$, each presenting a phase and an amplitude that depend on the angular position of the rotor of the electric motor. Each of the three first filtered signals $S_{f1}$ forms a current setpoint for a current servo-control loop of the electric motor.

Figure 2:
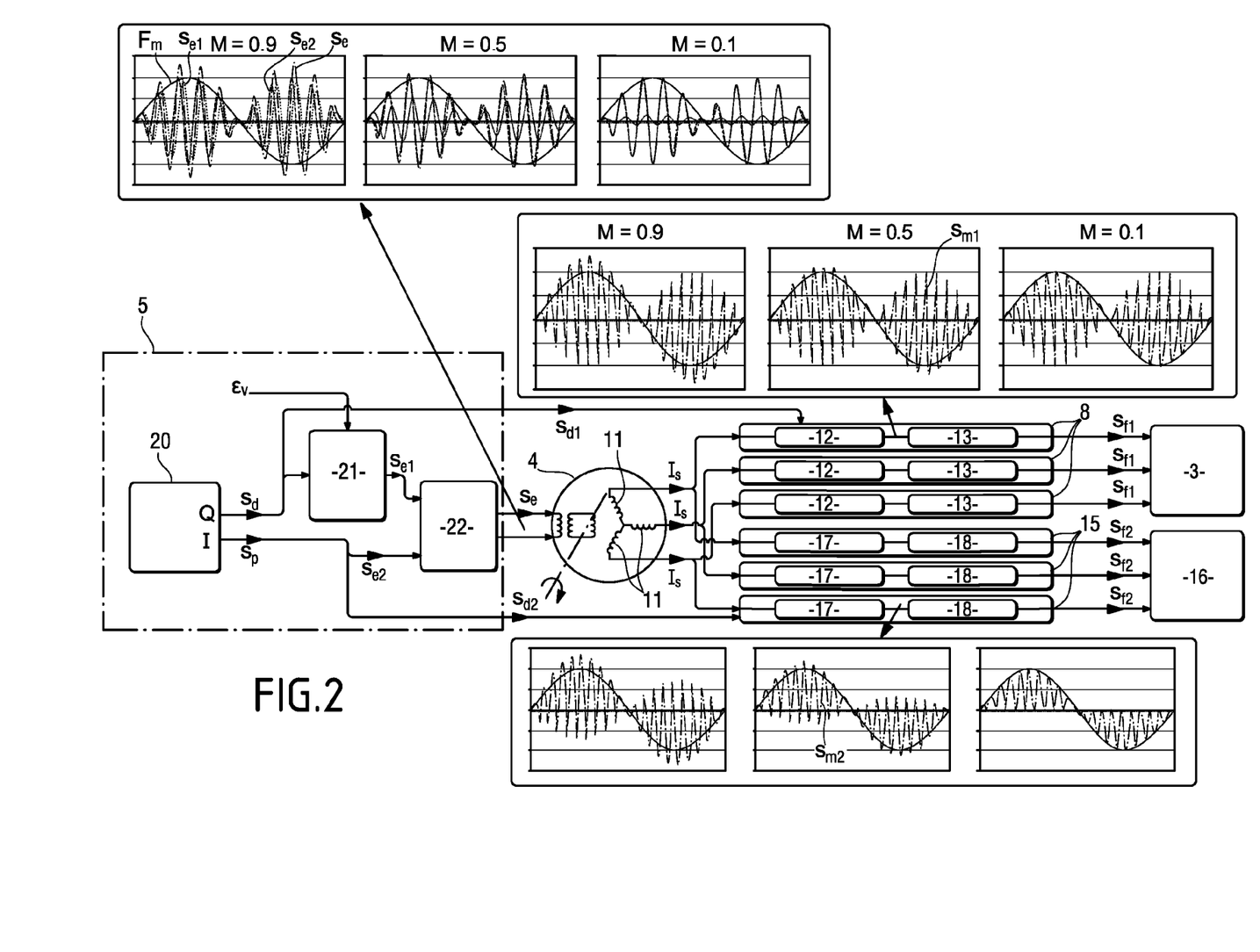
FIGS. 2 and 3 show the mode of coupling and generating current setpoint information as a function of angular position, and also the solution of using the synchro-transmitter to communicate the information serving to measure angular speed independently.
Figure 3:
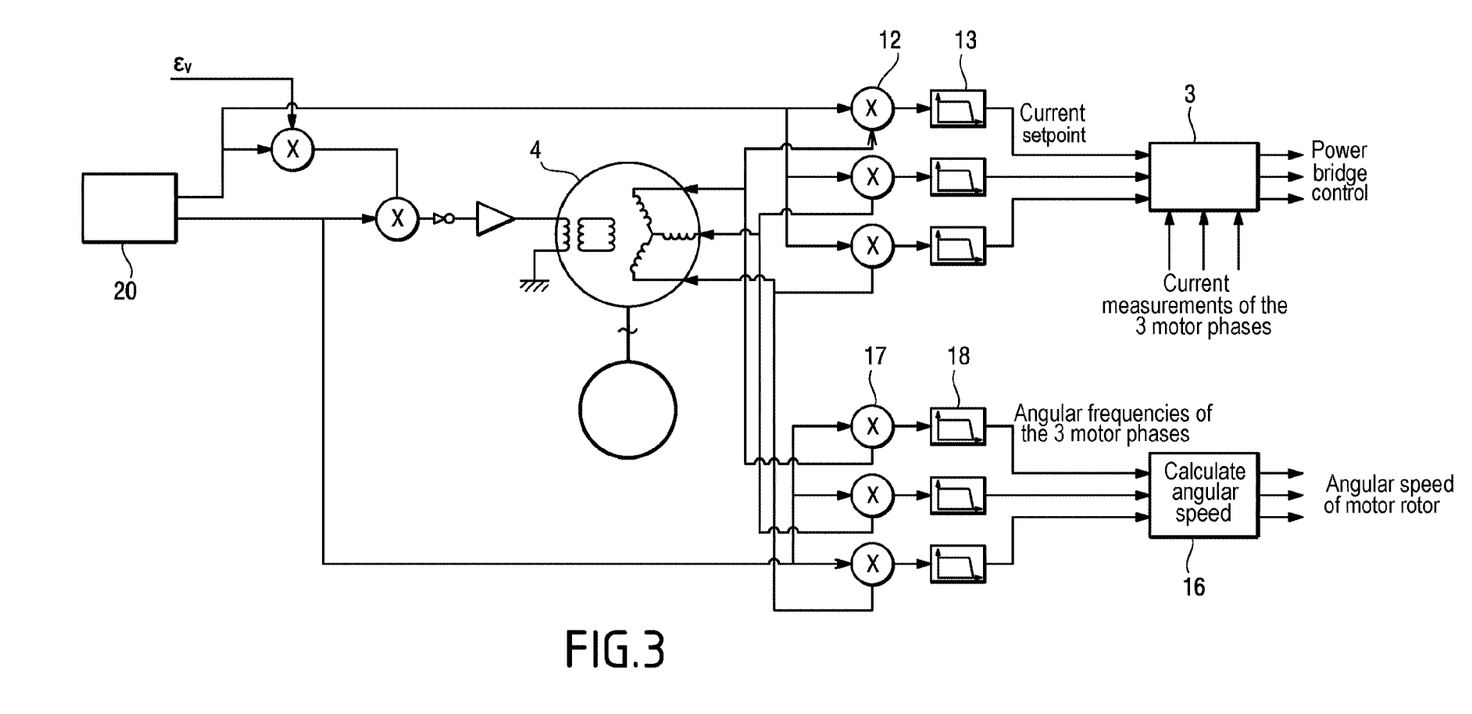

With reference to the FIGS. 2 and 3, the control device 1 also has three second synchronous demodulators 15 and an angular speed measurement module 16 that is connected to the second synchronous demodulators 15. Each second synchronous demodulator 15 is connected to a respective one of the measurement windings 11 of the synchro-transmitter 4.

Each second synchronous demodulator 15 comprises a second multiplier 17 and a second lowpass filter 18. The second multiplier 17 receives a second demodulation signal $S_{d2}$ at the excitation frequency $f_e$ from the excitation module 5, and it multiplies the stator current $I_s$, as present on the measurement winding 11 to which the second multiplier 17 is connected, by this second demodulation signal $S_{d2}$. A second multiplied signal $S_{m2}$ at the output from the second multiplier is applied as input to the second lowpass filter 18.

In this example, the second lowpass filter 18 is a third-order Butterworth filter presenting a −3 dB cutoff frequency of 5 kHz, or else a third-order Sallen Key active filter presenting a −3 dB cutoff frequency of 5 kHz, or indeed any other type of lowpass filter.

A second filtered signal $S_{f2}$ leaving the second lowpass filter 18 of each second synchronous demodulator 15 is applied as input to the angular speed measurement module 16.

The angular speed measurement module 16 thus receives three second filtered signals $S_{f2}$, each presenting an amplitude that depends on the angular position of the rotor of the electric motor. Each of the three second filtered signals $S_{f2}$ thus provides angular position information concerning the rotor of the electric motor. The three second filtered signals $S_{f2}$ serve to obtain a measured angular speed for the rotor of the electric motor. The measured angular speed serves to generate an angular speed error $\varepsilon_v$ of an angular speed servo-control loop for the electric motor.

The excitation module 5 comprises an IQ generator 20, a modulator 21, and a summing circuit 22. In this example, the summing circuit 22 is an analog summing circuit.

The IQ generator 20 has a Q output and an I output. A phase-shifted signal $S_d$ that is phase-shifted relative to a reference signal at the excitation frequency is present on the Q output of the IQ generator. An in-phase signal $S_p$ that is in phase relative to the reference signal at the excitation frequency is present on the I output of the IQ generator. The in-phase signal $S_p$ and the phase-shifted signal $S_d$ present a phase difference of 90°.

The first demodulation signal $S_{d1}$ is the phase-shifted signal $S_d$. The second demodulation signal $S_{d2}$ is the in-phase signal $S_p$.

The modulator 21 receives the angular speed error $\varepsilon_v$ of the angular speed servo-control loop for the electric motor and it multiplies the amplitude of the phase-shifted signal $S_d$ by the angular speed error $\varepsilon_v$ (and by ±1 depending on the direction of rotation of the rotor of the electric motor).

The modulator 21 thus produces a first excitation signal $S_{e1}$ from the phase-shifted signal $S_d$ present on the Q output of the IQ generator 20.

A second excitation signal $S_{e2}$ is produced from the in-phase signal $S_p$; specifically the second excitation signal $S_{e2}$ is equal to the in-phase signal $S_p$. The amplitude of the second excitation signal $S_{e2}$ is thus constant.

The summing circuit 22 then sums the first excitation signal $S_{e1}$ and the second excitation signal $S_{e2}$ in order to obtain the excitation signal $S_e$.

In the curves of FIG. 2, there can thus be seen the first excitation signal $S_{e1}$, the second excitation signal $S_{e2}$, and the excitation signal $S_e$, when the amplitude ratio M between the second excitation signal $S_{e2}$ and the first excitation signal $S_{e1}$ is equal to 0.9, when the ratio M is equal to 0.5, and when the ratio M is equal to 0.1. In these curves, the frequency $F_m$ of the electric motor is equal to 500 hertz (Hz), and thus the angular speed of the rotor of the electric motor is equal to 15,000 revolutions per minute (rpm).

In the curves of FIG. 2, there can also be seen first multiplied signal $S_{m1}$ when the amplitude ratio M between the second excitation signal $S_{e2}$ and the first excitation signal $S_{e1}$ is equal to 0.9, when the ratio M is equal to 0.5, and when the ratio M is equal to 0.1.

In the curves of FIG. 2, there can also be seen the second multiplied signal $S_{m2}$ when the amplitude ratio between the second excitation signal $S_{e2}$ and the first excitation signal $S_{e1}$ is equal to 0.9, when the ratio M is equal to 0.5, and when the ratio M is equal to 0.1.

Figure 4:
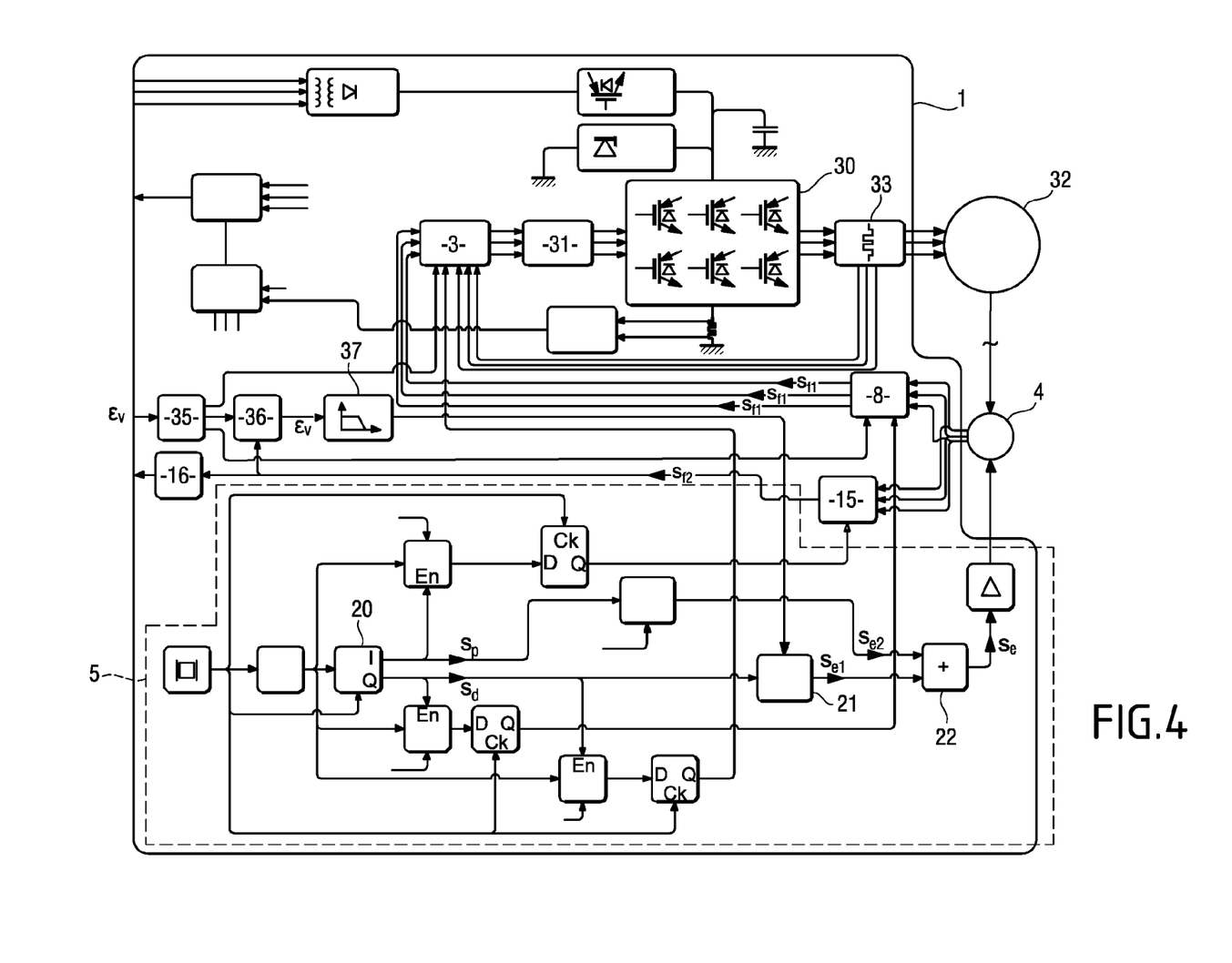
FIG. 4 is a diagram of the complete control device of the invention.

FIG. 4 shows all of the elements of the above-described control device 1.

The control module 3 generates the three-phase control signals that are transmitted to the inverter 30 via a power bridge interface 31.

The electric motor 32 is current servo-controlled by the current servo-control loop that comprises the control module 3, the synchro-transmitter 4, the first synchronous demodulators 8, and the excitation module 5. The three first filtered signals $S_{f1}$ output by the first synchronous demodulators 8 form respective current setpoints for the current servo-control loop. The current servo-control loop also has a current measurement module 33 that produces measurements of the phase currents that are present on the phases of the electric motor 32 and that power the electric motor 32.

The electric motor 32 is servo-controlled in angular speed by the angular speed servo-control loop that comprises the angular speed measurement module 16, the synchro-transmitter 4, the second synchronous demodulators 15, and the excitation module 5.

The angular speed servo-control loop also includes an angular speed setpoint interface 35, a module 36 for measuring angular speed error, and a processor block 37.

The angular speed setpoint interface 35 receives an angular speed setpoint $C_v$ and transmits the angular speed setpoint $C_v$ to the module 36 for measuring angular speed error. The angular speed setpoint interface 35 also transmits to the control module authorization to control the electric motor 32, and to the first synchronous demodulators 8 the direction of rotation of the rotor of the electric motor 32.

The module 36 for measuring angular speed error produces an angular speed error $\varepsilon_v$ from the angular speed setpoint $C_v$ and the measured angular speed as produced from the three second filtered signal $S_{f2}$ output by the three second synchronous demodulators 15.

The processor block 37, which implements an error amplifier and a first order lowpass filter, transmits the angular speed error $\varepsilon_v$ to the modulator block 21 of the excitation module 5.

This produces both a current servo-control loop and an angular speed servo-control loop for the electric motor 32, which loops are nested by the synchro-transmitter 4 and by means of the excitation module 5. The current setpoints of the current servo-control loop, on the basis of which the control module 3 controls the inverter 30 and controls the electric motor 32, are generated from the angular speed error $\varepsilon_v$. The angular speed error $\varepsilon_v$ is itself used to produce the first excitation signal $S_{e1}$ from the phase-shifted signal $S_d$ present on the Q output of the IQ generator 20, and thus the excitation signal $S_e$ that is applied to the excitation winding 9 of the synchro-transmitter 4.

It should be observed that the angular position information serving to obtain the angular speed measurement (Q channel) is independent of the current setpoints (I channel).

Specifically, the I and Q signals are in quadrature and they are independent and demodulated as such by the first synchronous demodulators and by the second synchronous demodulators. There follows a more detailed description of some of the elements described above.

Figure 5:
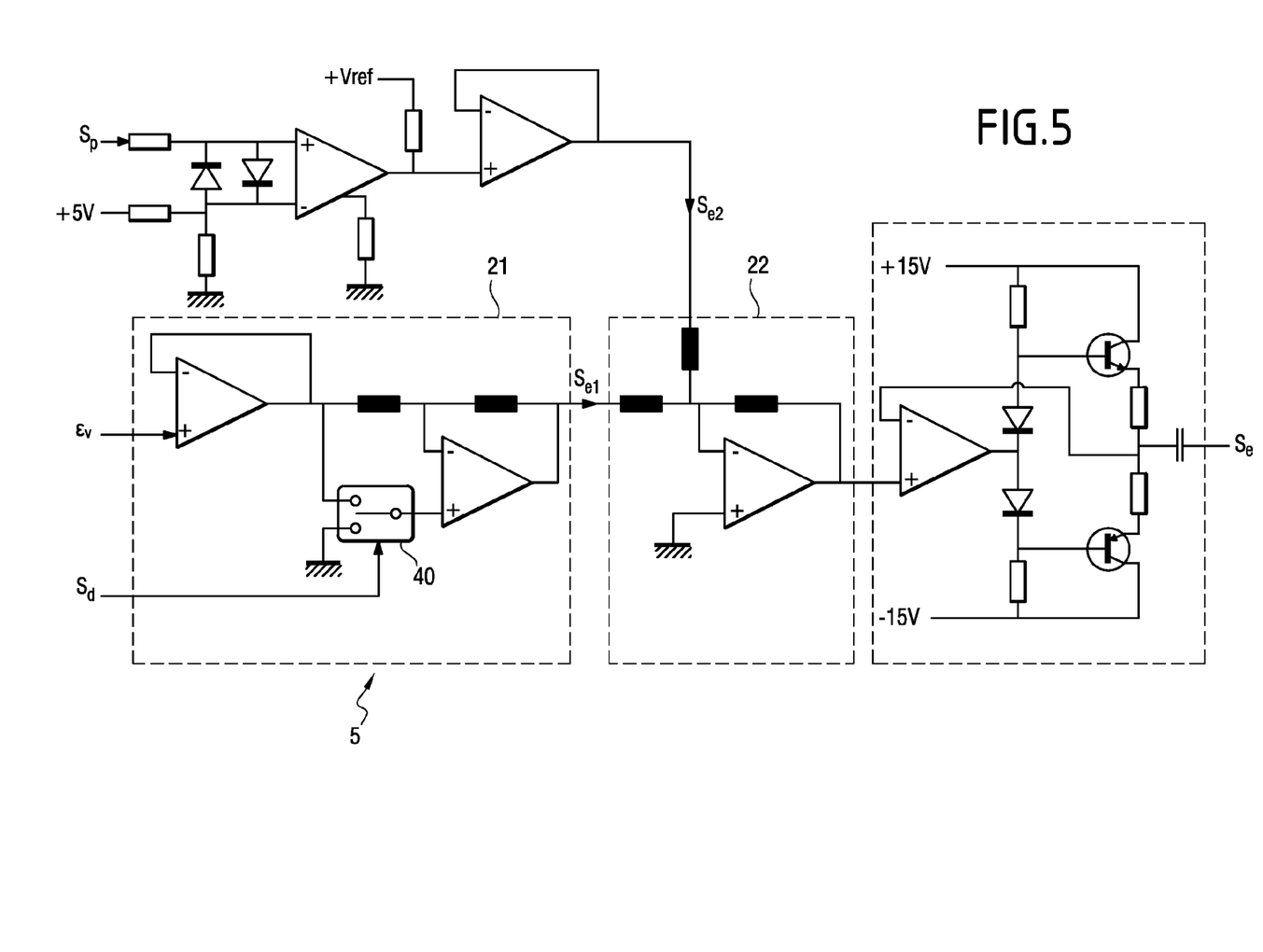
FIG. 5 shows an embodiment of the excitation module of the control device of the invention, and shows how it operates.

With reference to FIG. 5, the excitation module 5 uses the in-phase signal $S_p$ (present on the I output of the IQ generator) to produce the first excitation signal $S_{e1}$. The excitation module 5 also produces the phase-shifted signal $S_d$ (present on the Q output of the IQ generator), and it receives an angular speed error $\varepsilon_v$. The phase-shifted signal $S_d$ and the angular speed error $\varepsilon_v$ are transmitted to the modulator 21. The modulator 21 comprises a multiplier 40 that multiplies the amplitude of the phase-shifted signal $S_d$ by the angular speed error $\varepsilon_v$ in order to obtain the second excitation signal $S_{e2}$. The summing circuit 22 adds the first excitation signal $S_{e1}$ and the second excitation signal $S_{e2}$, and a power module 41 uses the output from the summing circuit 22 to produce the excitation signal $S_e$.

Figure 6:
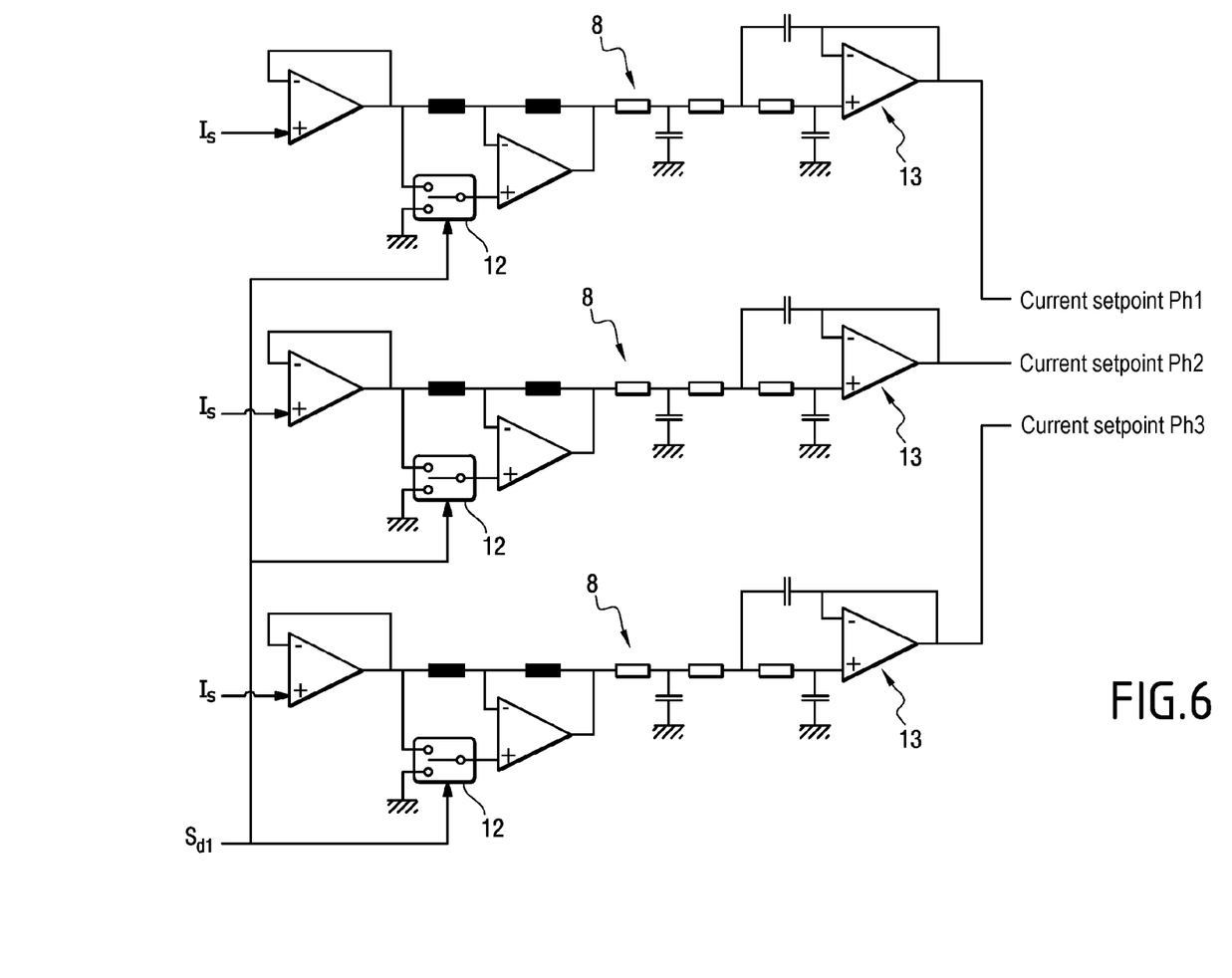
FIG. 6 shows an embodiment of the first synchronous demodulators of the control device of the invention.

With reference to FIG. 6, each of the first synchronous demodulators 8 comprises a first multiplier 12 and a first lowpass filter 13. Each first multiplier 12 multiplies the first demodulation signal $S_{d1}$ by the stator current $I_s$ present on the measuring winding 11 to which the first multiplier 12 is connected.

The first lowpass filter 13 shown in FIG. 5 is a third-order Sallen Key active filter presenting a −3 dB cutoff frequency of 5 kHz, with attenuation of 36 dB at the frequency of 20 kHz (said frequency corresponding to the frequency of the signal obtained by full-wave rectification of the frequency $f_e$=10 kHz).

Figure 7:
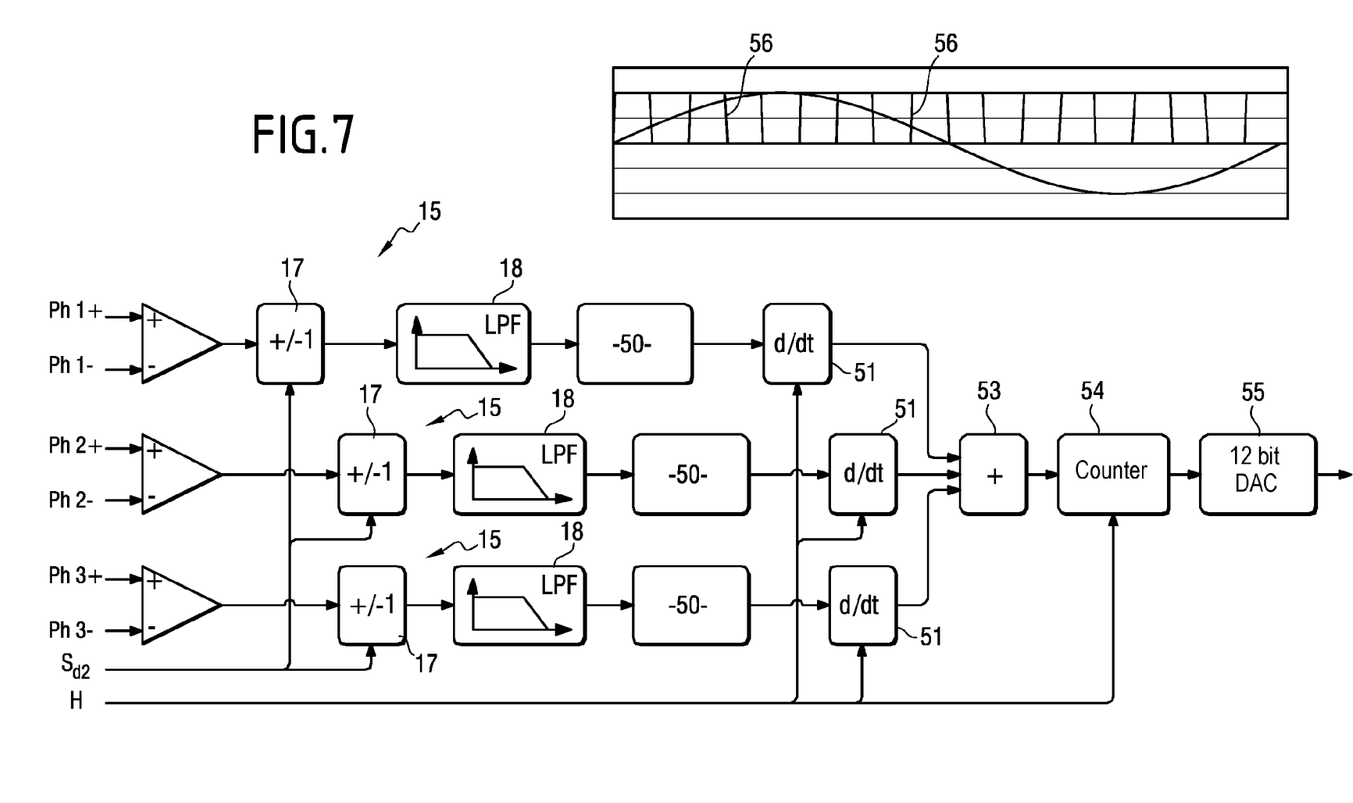
FIG. 7 shows an embodiment of the synchronous demodulators of the angular speed measurement device of the invention, with second demodulators that are connected to an angular speed measurement module.

With reference to FIG. 7, each second synchronous demodulator 15 comprise a second multiplier 17 that multiplies a voltage representative of the signal present on the measuring winding 11 to which the second synchronous demodulator 15 is connected by the second demodulation signal $S_{d2}$.

The voltages representative of the signals present on the measuring windings 11 are Ph1+ & Ph1−, Ph2+ & Ph2−, and Ph3+ & Ph3−. A gain of ±1 is also applied by each second multiplier 17.

At the output from each second multiplier 17, the second multiplied signal is applied as input to a second lowpass filter 18. The output from the second lowpass filter 18 is applied as input to a comparator 50 of the angular speed measurement module 16, constituted in this example by a six-level comparator. The output from the comparator 50 is differentiated by a differentiator 51 clocked by a clock H at a clock frequency which is equal to 5.12 megahertz (MHz) in this example.

Thereafter, the outputs from each of the differentiators 51 are summed by a summing circuit 53. This produces a digital angular speed signal comprising eighteen pulses 56 per revolution of the rotor of the electric motor 32. The output from the summing circuit 53 is applied as input to a counter 54. The output from the counter 54 is applied as input to a digital-to-analog converter 55. The digital-to-analog converter 55 in this example is a twelve-bit digital-to-analog converter likewise clocked by the clock H. The digital-to-analog converter 55 takes the output from the counter 54 and produces a measured angular speed, in the form of an analog measurement. The measured angular speed is then used by the module 36 for measuring angular speed error (see FIG. 3) in order to produce the angular speed error $\varepsilon_v$.

Figure 8:
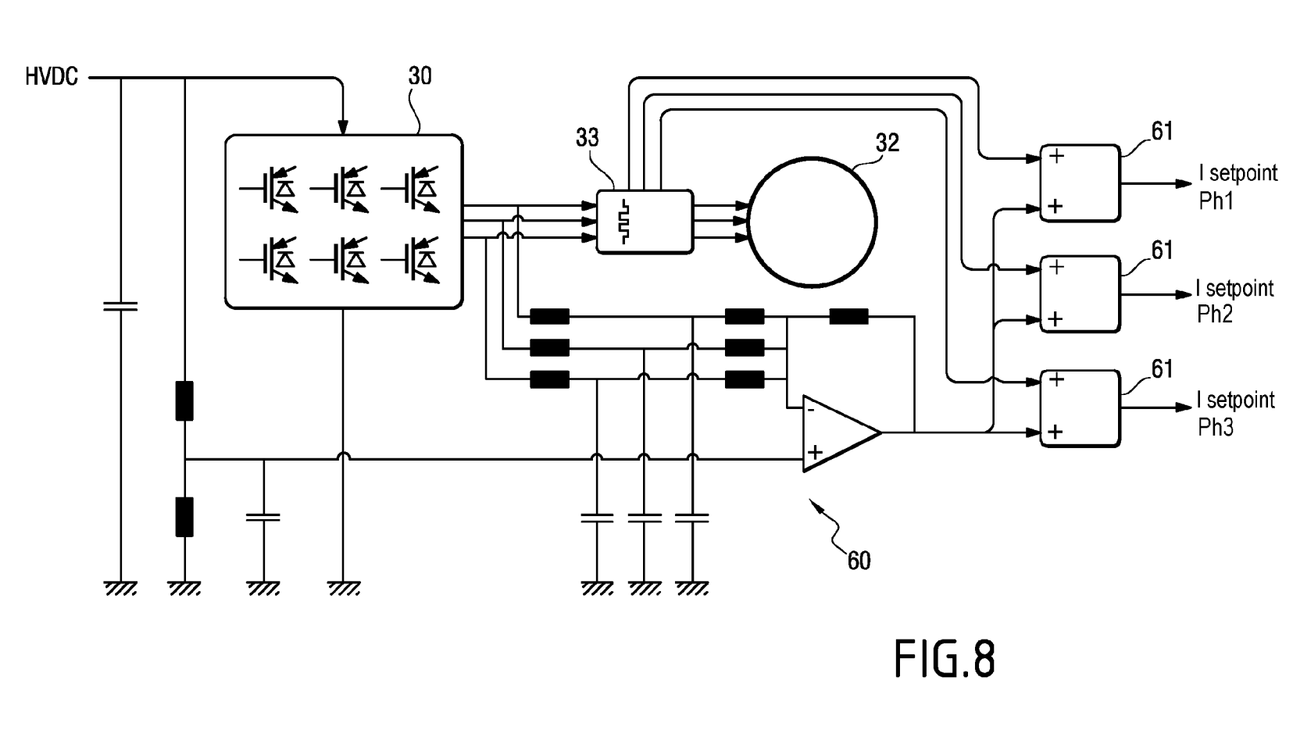
FIG. 8 shows means for providing detection of and protection against divergence of the current servo-control loop.

With reference to FIG. 8, the control device 1 also has means for providing protection against divergence of the current servo-control loop of the electric motor 32.

These protection means make use of the current measurement module 33 and they comprise a mean voltage measurement module 60 and three summing circuits 61.

Each summing circuit 61 adds a measurement of a phase current present on one of the phases of the electric motor 32 as produced by the current measurement module 33 and a mean voltage generated by the mean voltage measurement module 60, said mean voltage being equal to a mean of the voltages present on each of the output phases from the inverter 30.

The control module 3 receives the output signals from the summing circuit 61 and on the basis of these signals it corrects the mean offset of the phase current and the mean voltage at the output from the inverter 30 by adapting the three-phase signals that control the inverter 30.

Naturally, the invention is not limited to the embodiment described but covers any variant coming within the ambit of the invention as defined by the claims.

The values of the frequencies mentioned in this document, and in particular the value of the excitation frequency, are given solely by way of example, and could naturally be different.

Likewise, the orders and the cutoff frequencies of the lowpass filters could be different. The lowpass filters are not necessarily filters of the Butterworth or Sallen Key type.

Likewise, the amplitudes of the signals that can be seen in FIGS. 1 and 2 could naturally be different.

The invention claimed is:

1. A control device for a three-phase electric motor, the control device comprising:
   an inverter;
   an excitation module producing an excitation signal;
   a synchro-transmitter having two coupling windings, one excitation winding constrained to rotate with a rotor of the electric motor, and three measurement windings mounted on a stator of the electric motor, the excitation signal being applied to the excitation winding via the two coupling windings;
   three first synchronous demodulators, each connected to a respective one of the three measurement windings of the synchro-transmitter, and each generating a respective current setpoint of a current servo-control loop for the electric motor, which is implemented for generating inverter control signals; and
   three second synchronous demodulators, each connected to a respective one of the three measurement windings of the synchro-transmitter in order to produce information concerning the angular position of the rotor.

2. The control device according to claim 1, wherein the information concerning the angular position of the rotor is independent of the current setpoint.

3. The control device according to claim 2, including an angular speed measurement module connected to the second synchronous demodulators in order to measure the angular speed of the rotor of the electric motor, the angular speed measurement module being used to generate an angular speed error of an angular speed servo-control loop for the electric motor.

4. The control device according to claim 3, wherein the excitation signal amplitude is modulated by the angular speed error.

5. The control device according to claim 4, wherein the excitation signal is obtained by summing both a first excitation signal having an amplitude that is a function of the angular speed error and also a second excitation signal, each of the first synchronous demodulators being adapted to detect a signal having the same frequency and in-phase with the first excitation signal, and each of the second synchronous demodulators being adapted to detect a signal having the same frequency and in-phase with the second excitation signal.

6. The control device according to claim 5, wherein the excitation module comprises an IQ type generator, the first excitation signal being produced from a signal that is phase-shifted relative to a reference signal and present on a Q output of the IQ type generator, and the second excitation signal being produced from a signal that is in-phase with the reference signal and present on the I output of the IQ type generator.

7. The control device according to claim 6, wherein the phase-shifted signal and the in-phase signal present a phase difference of 90°.

8. The control device according to claim 6, wherein the excitation module further comprises a modulator and a summing circuit, the modulator multiplying the phase-shifted signal by the angular speed error in order to obtain the first excitation signal, the second excitation signal being the in-phase signal, and the summing circuit being adapted to sum the first excitation signal and the second excitation signal in order to obtain the excitation signal.

9. The control device according to claim 1, wherein the control module is of the pulse-width modulation type.

* * * * *